(12) United States Patent
Jiang et al.

(10) Patent No.: US 10,943,582 B2
(45) Date of Patent: Mar. 9, 2021

(54) METHOD AND APPARATUS OF TRAINING ACOUSTIC FEATURE EXTRACTING MODEL, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Bing Jiang, Beijing (CN); Xiaokong Ma, Beijing (CN); Chao Li, Beijing (CN); Xiangang Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 255 days.

(21) Appl. No.: 15/979,018

(22) Filed: May 14, 2018

(65) Prior Publication Data
US 2018/0336888 A1 Nov. 22, 2018

(30) Foreign Application Priority Data
May 19, 2017 (CN) .......................... 201710359207.1

(51) Int. Cl.
*G10L 15/16* (2006.01)
*G06N 3/04* (2006.01)
(Continued)

(52) U.S. Cl.
CPC .............. *G10L 15/16* (2013.01); *G06N 3/04* (2013.01); *G06N 3/0445* (2013.01);
(Continued)

(58) Field of Classification Search
CPC ...... G06N 3/08; G06N 3/0445; G06N 3/0454; G06N 3/04; G10L 25/30
(Continued)

(56) References Cited

U.S. PATENT DOCUMENTS 5,553,196 A * 9/1996 Takatori .................... G06K 9/48
706/31
9,401,148 B2 * 7/2016 Lei .......................... G10L 17/18
(Continued)

FOREIGN PATENT DOCUMENTS

CN 106295803 A 1/2017
CN 106683680 A 5/2017

OTHER PUBLICATIONS

Chinese Office Action dated Dec. 4, 2019, for related Chinese Appln. No. 201710359207.1; 5 Pages.
(Continued)

*Primary Examiner* — Jesse S Pullias
(74) *Attorney, Agent, or Firm* — Brooks Kushman PC

(57) ABSTRACT

A method and apparatus of training an acoustic feature extracting model, a device and a computer storage medium. The method comprises: considering a first acoustic feature extracted respectively from speech data corresponding to user identifiers as training data; training an initial model based on a deep neural network based on a criterion of a minimum classification error, until a preset first stop condition is reached; using a triplet loss layer to replace a Softmax layer in the initial model to constitute an acoustic feature extracting model, and continuing to train the acoustic feature extracting model until a preset second stop condition is reached, the acoustic feature extracting model being used to output a second acoustic feature of the speech data; wherein the triplet loss layer is used to maximize similarity between the second acoustic features of the same user, and minimize similarity between the second acoustic features of different users.

21 Claims, 7 Drawing Sheets

(51) Int. Cl.
*G10L 15/02* (2006.01)
*G10L 15/06* (2013.01)
*G06N 3/08* (2006.01)

(52) U.S. Cl.
CPC ............. *G06N 3/0454* (2013.01); *G06N 3/08* (2013.01); *G10L 15/02* (2013.01); *G10L 15/063* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 9,824,692 | B1* | 11/2017 | Khoury | G10L 15/16 |
| 10,008,209 | B1* | 6/2018 | Qian | G10L 17/18 |
| 2004/0260550 | A1* | 12/2004 | Burges | G10L 17/00 |
| | | | | 704/259 |
| 2014/0214417 | A1* | 7/2014 | Wang | G10L 17/18 |
| | | | | 704/232 |
| 2015/0112684 | A1* | 4/2015 | Scheffer | G10L 17/14 |
| | | | | 704/257 |

OTHER PUBLICATIONS

Deep Speaker:an End-to-End Neural Speaker Embedding System, by Chao Li, Xiaokong Ma, Bing Jiang, Xiangang Li Xuewei Zhang, Xiao Liu, Ying Cao, Ajay Kannan, Zhenyao Zhu; May 2017; 8 pages.

* cited by examiner

METHOD AND APPARATUS OF TRAINING ACOUSTIC FEATURE EXTRACTING MODEL, DEVICE AND COMPUTER STORAGE MEDIUM

The present application claims the priority of Chinese Patent Application No. 2017103592071, filed on May 19, 2017, with the title of "Method and apparatus of training acoustic feature extracting model, device and computer storage medium". The disclosure of the above applications is incorporated herein by reference in its entirety.

FIELD OF THE DISCLOSURE

The present disclosure relates to the technical field of computer application, and particularly to a method and apparatus of training an acoustic feature extracting model, a device and a computer storage medium.

BACKGROUND OF THE DISCLOSURE

As artificial intelligence develops constantly, speech interaction has become one of the most natural interaction manners and spreads increasingly. Sound recognition technology draws people's more and more attention. In sound recognition technologies, extraction of acoustic features is a kernel technique and it may be applied to user recognition, verification, classification or the like.

In a current acoustic feature extracting model, a deep neural network is increasingly used. During training of the model with the deep neural network, a Softmax recurrent manner is mostly used. However, this Softmax recurrent manner exhibits a poor performance and lower accuracy when the feature space is very large.

SUMMARY OF THE DISCLOSURE

The present disclosure provides a method and apparatus of training an acoustic feature extracting model, a device and a computer storage medium, to facilitate improving performance and accuracy of the model training.

Specific technical solutions are as follows:

The present disclosure provides a method of training an acoustic feature extracting model, the method comprising:

considering a first acoustic feature extracted respectively from speech data corresponding to user identifiers as training data;

training an initial model based on a deep neural network based on a criterion of a minimum classification error, until a preset first stop condition is reached;

using a triplet loss layer to replace a Softmax layer in the initial model to constitute an acoustic feature extracting model, and continuing to train the acoustic feature extracting model until a preset second stop condition is reached, the acoustic feature extracting model being used to output a second acoustic feature of the speech data;

wherein the triplet loss layer is used to maximize similarity between the second acoustic features of the same user, and minimize similarity between the second acoustic features of different users.

According to a preferred embodiment of the present disclosure, the first acoustic feature comprises an FBank64 acoustic feature.

According to a preferred embodiment of the present disclosure, the initial model based on the deep neural network comprises: a deep neural network, a pooling layer and a Softmax layer;

the deep neural network is used to learn the first acoustic feature of each speech data, and output the second acoustic feature at a frame level;

the pooling layer is used to perform sentence averaging processing for the second acoustic feature at the frame level, to obtain the second acoustic feature at a sentence level;

the Softmax layer is used to map the second acoustic feature at the sentence level to a class corresponding to each user identifier.

According to a preferred embodiment of the present disclosure, the criterion of the minimum classification error comprises a cross entropy rule.

According to a preferred embodiment of the present disclosure, the deep neural network comprises a convolutional neural network CNN, a residual convolutional neural network ResCNN or a Gated Recurrent Unit GRU.

According to a preferred embodiment of the present disclosure, the first stop condition comprises at least one of the following:

an iteration value tends to converge;

a performance of the initial model on a test set tends to converge.

According to a preferred embodiment of the present disclosure, the triplet loss layer is specifically used to use the second acoustic features of respective speech data to calculate the triplet loss, and the triplet loss is used to fine-tune parameters of the deep neural network to minimize the triplet loss;

wherein the triplet loss reflects a state of difference between similarity between the second acoustic features of different users and similarity between the second acoustic features of the same user.

According to a preferred embodiment of the present disclosure, the second stop condition comprises at least one of the following:

an iteration value tends to converge;

a performance of the acoustic feature extracting model on a test set tends to converge.

The present disclosure further provides an acoustic feature extracting method, wherein the method comprises:

extracting a first acoustic feature of to-be-processed speech data;

inputting the first acoustic feature into an acoustic feature extracting model, to obtain a second acoustic feature of the to-be-processed speech data;

wherein the acoustic feature extracting model is obtained by pre-training by using the method of training the acoustic feature extracting model.

The present disclosure further provides an apparatus of training an acoustic feature extracting model, the apparatus comprising:

a training data obtaining unit configured to consider a first acoustic feature extracted respectively from speech data corresponding to user identifiers as training data;

an initial model training unit configured to train an initial model based on a deep neural network based on a criterion of a minimum classification error, until a preset first stop condition is reached;

an extracting model training unit configured to use a triplet loss layer to replace a Softmax layer in the initial model to constitute an acoustic feature extracting model, and continue to train the acoustic feature extracting model until a preset second stop condition is reached, the acoustic feature extracting model being used to output a second acoustic feature of the speech data;

wherein the triplet loss layer is used to maximize similarity between the second acoustic features of the same user, and minimize similarity between the second acoustic features of different users.

According to a preferred embodiment of the present disclosure, the first acoustic feature comprises an FBank64 acoustic feature.

According to a preferred embodiment of the present disclosure, the initial model based on the deep neural network comprises: a deep neural network, a pooling layer and a Softmax layer;

the deep neural network is used to learn the first acoustic feature of each speech data, and output the second acoustic feature at a frame level;

the pooling layer is used to perform sentence averaging processing for the second acoustic feature at the frame level, to obtain the second acoustic feature at a sentence level;

the Softmax layer is used to map the second acoustic feature at the sentence level to a class corresponding to each user identifier.

According to a preferred embodiment of the present disclosure, the criterion of the minimum classification error comprises a cross entropy rule.

According to a preferred embodiment of the present disclosure, the deep neural network comprises a convolutional neural network CNN, a residual convolutional neural network ResCNN or a Gated Recurrent Unit GRU.

According to a preferred embodiment of the present disclosure, the first stop condition comprises at least one of the following:

an iteration value tends to converge;

a performance of the initial model on a test set tends to converge.

According to a preferred embodiment of the present disclosure, the triplet loss layer is specifically used to use the second acoustic features of respective speech data to calculate the triplet loss, and the triplet loss is used to fine-tune parameters of the deep neural network to minimize the triplet loss;

wherein the triplet loss reflects a state of difference between similarity between the second acoustic features of different users and similarity between the second acoustic features of the same user.

According to a preferred embodiment of the present disclosure, the second stop condition comprises at least one of the following:

an iteration value tends to converge;

a performance of the acoustic feature extracting model on a test set tends to converge.

The present disclosure further provides an acoustic feature extracting apparatus, wherein the apparatus comprises:

a pre-processing unit configured to extract a first acoustic feature of to-be-processed speech data;

a feature extracting unit configured to input the first acoustic feature into an acoustic feature extracting model, to obtain a second acoustic feature of the to-be-processed speech data;

wherein the acoustic feature extracting model is obtained by pre-training by using the aforesaid apparatus of training the acoustic feature extracting model.

The present disclosure further provides a device, comprising:

one or more processors;

a memory for storing one or more programs, the one or more programs, when executed by said one or more processors, enabling said one or more processors to implement the above-mentioned method.

The present disclosure further provides a storage medium containing computer-executable instructions which, when executed by a computer processor, are used to implement the above-mentioned method.

As can be seen from the above technical solutions, first the initial model based on the deep neural network is trained based on the criterion of a minimum classification error, until the preset first stop condition is reached, then a triplet loss layer is used to replace the Softmax layer in the initial model, and the acoustic feature extracting model is continued to be trained until a preset second stop condition is reached. Such pre-training+fine-tuning model training manner can improve the performance and accuracy of the model training in a larger feature space as compared with a recurrent training manner purely using Softmax.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event)

is detected" may be construed as "when . . . is determined" or "responsive to determining" or "when . . . (stated condition or event) is detected" or "responsive to detecting (stated condition or event)".

A core idea of the present disclosure is dividing training of the whole acoustic feature extracting model into a pre-training phase and a fine-tuning phase. In the pre-training phase, an initial model based on a deep neural network is trained based on a criterion of a minimum classification error. In the fine-tuning phase, a triplet loss layer is used to replace the softmax layer, and model training is continued to obtain a final acoustic feature extracting model. The method will be described in detail in combination with embodiments.

Figure 1:
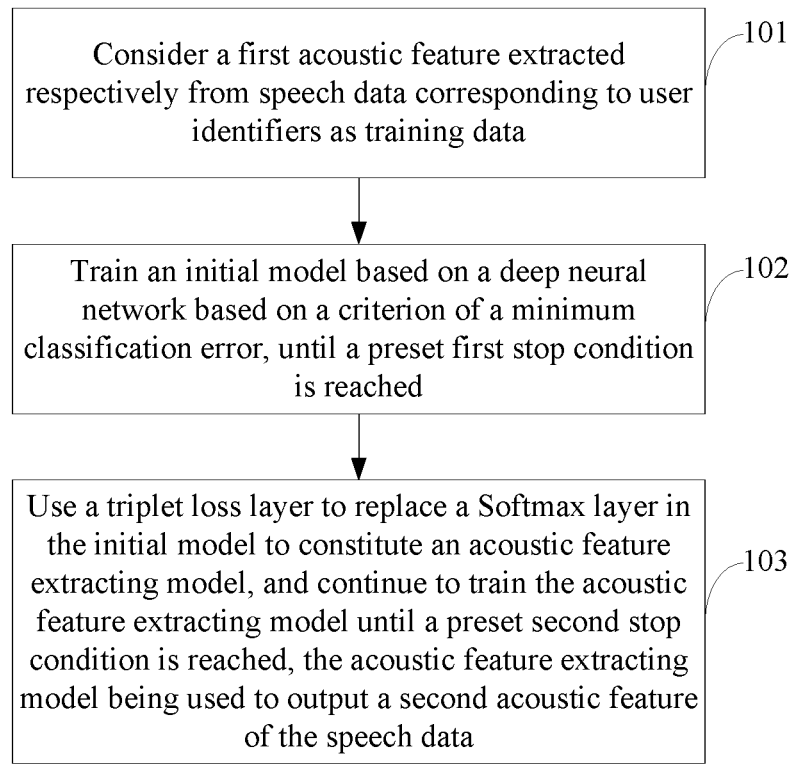
FIG. 1 is a flow chart of a method of training an acoustic feature extracting model according to an embodiment of the present disclosure.

FIG. 1 is a flow chart of a method of training an acoustic feature extracting model according to an embodiment of the present disclosure. As shown in FIG. 1, the method may comprise the following steps:

In 101, a first acoustic feature extracted respectively from speech data corresponding to user identifiers is considered as training data.

In the present disclosure, when the acoustic feature extracting model is trained, it is necessary to first extract a low-level acoustic feature from speech data in the training data, namely, perform pre-processing. The low-level acoustic feature has a coarser granularity than a high-level acoustic feature and includes coarser information quantity; on the contrary, the high-level acoustic feature obtained after the processing by the acoustic feature extracting model has a finer granularity than the low-level acoustic feature, includes finer information quantity, and is more adapted to build a voiceprint model to establish the user's voiceprint. In the embodiment of the present disclosure, to distinguish the two kinds of acoustic features, the low-level acoustic feature obtained after pre-processing the speech data is called a first acoustic feature; the high-level acoustic feature obtained after the acoustic feature extracting model processes the low-level acoustic feature is called a second acoustic feature.

In this step, it is feasible to pre-collect a known user's speech data, and upon selecting training data, impose some requirements for quality of these speech data, e.g., select speech data with a better definition, and then for example delete speech data with a too long or too short length.

The collected speech data is first pre-processed to extract therefrom the first acoustic feature of respective speech data. As stated above, the first acoustic feature is the low-level acoustic feature. In the embodiment of the present disclosure, an FBank (Mel-scale Filter Bank) feature may be used as the first acoustic feature. For example, the FBank feature of the speech data is extracted with 25 ms as a frame and with 10 ms as a step length. However, the present disclosure is not limited to the FBank feature and other features may be used as the first acoustic features.

As such, the first acoustic feature corresponding to each user identifier may be obtained to constitute the training data. The present disclosure does not limit the specific type of the user identifier. The user identifier may be any type of identifier so long as the users can be distinguished. The training data may include the first acoustic features of different speech data corresponding to the same user, first acoustic features of speech data corresponding to different users, and the like. Each first acoustic feature in the training data has a corresponding user identifier as a tag.

In 102, the initial model based on the deep neural network is trained based on a criterion of a minimum classification error, until a preset first stop condition is reached.

Figure 2:
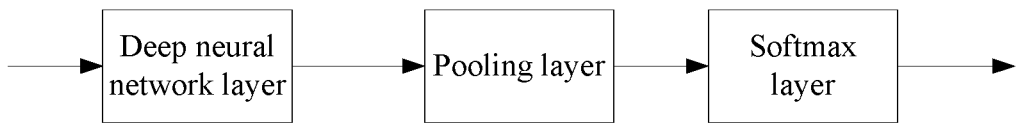
FIG. 2 is a schematic diagram of a deep neural network-based initial model according to an embodiment of the present disclosure.

The initial model based on the deep neural network involved in this step is as shown in FIG. 2 and mainly comprises three layers: a deep neural network, a pooling layer and a softmax layer.

The deep neural network is used to learn the first acoustic feature of each speech data, and output the second acoustic feature at a frame level.

The deep neural network may employ CNN, GRU (Gated Recurrent Unit) and the like. Certainly, other types of deep neural networks such as RNN and LSTM may be employed. Since CNN can more effectively reduce spectrum changes and reflect spectrum correlation in the acoustic features as compared with RNN and LSTM, CNN is preferably selected as the deep neural network in the embodiment of the present disclosure.

However, although the deep neural network has an excellent learning capability, it is trained more difficulty. The accuracy undesirably drops in the case of certain depth. To solve the problem, the present disclosure may, based on CNN, uses but is not limited to ResNet (Residual Net)-type CNN, or uses GRU.

First, the ResNet-type CNN is introduced first.

Figure 3:
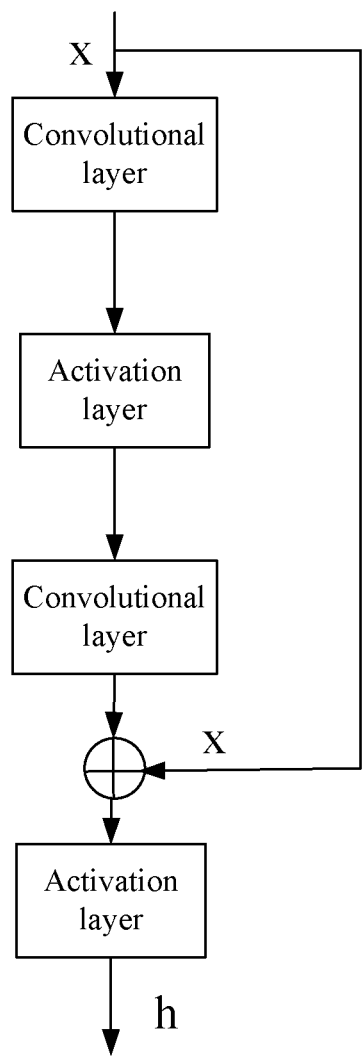
FIG. 3 is a schematic diagram of stacked residual blocks according to an embodiment of the present disclosure.

ResNet may be used to simplify the training of CNN. ResNet includes several stacked ResBlocks which each comprise a direct connection between low-level output and high-level input. As shown in FIG. 3, each ResBlock may be defined as:

$$h = F(x, W_i) + x$$

Wherein x and h respectively represent input and output of ResBlocks. F represents a mapping function of a non-linear layer of the stack.

As shown in FIG. 3, the ResBlock may comprise two convolutional layers and two activation layers, wherein the two convolutional layers may comprise for example 3×3 filters and 1×1 strides. Each ResBlock comprises the same structure, and jump connection is the same mapping for x. If the number of channels increases, a convolutional layer (e.g., having 5×5 filters and 2×2 strides) may be used. Hence, frequency dimensionality keeps constant in the convolutional layer for ever. It is found after research that speech recognition is not sensitive to the strides on temporal dimensionality. In the embodiment of the present disclosure, the following ReLU function may be used as non-linear processing of all activation layers:

$$\sigma(x) = \min\{\max\{x, 0\}, 20\}$$

GRU is introduced below.

As compared with LSTM, GRU exhibits a quicker training speed and a smaller diffusion degree. In the embodiment of the present disclosure, the deep neural network layer may employ a plurality of GRUs. For example, each GRU may comprise a convolutional layer with 5×5 filters and 2×2 strides, can reduce the dimensionality of time domain and frequency domain and thereby allow the calculation speed of GRU quicker. Immediately adjacent to the convolutional layer are three forward GRU layers which have 1024 units and are cyclic in time dimensionality. For example ReLU may be used in the GRU for activation.

The upper layer of the deep neural network is a pooling layer. The pooling layer is used to perform sentence averaging processing for the second acoustic feature at a frame level output by the deep neural network, to obtain the second acoustic feature at a sentence level.

The output h' of the pooling layer may employ the following formula:

$$h' = \frac{1}{T}\sum_{t=0}^{T-1} x'(t)$$

Wherein T is the number of frames contained by the sentence, and x'(t) is input of the pooling layer.

Through the processing of the pooling layer, the acoustic feature extracting model according to the embodiment of the present disclosure can process sentences of different time lengths and applies to text-independent cases.

In addition, the pooling layer may further comprise an affine layer (not shown in FIG. 2) which is used to project the second acoustic feature at the sentence level to a preset dimensionality for example to 512 dimensions.

The initial model of the deep neural network in the present embodiment is in fact a multi-class model whose output layer is a Softmax layer mainly functioning to map the second acoustic feature at the sentence level to a class corresponding to each user identifier.

In the present disclosure, the pre-training procedure is in fact used to initialize parameters of the deep neural network so that the initialized deep neural network can minimize a classification error of the Softmax layer. Then, triplet loss is used to continue to perform model training and fine-tune the parameters of the deep neural network. The criterion of the minimum classification error may comprise a cross entropy rule. Since the Softmax layer and cross entropy rule are known concepts in the prior art and are not detailed any more here.

Since the Softmax layer corresponds to multiple classes, usually the number of users for the training sample is the same the number of nodes corresponding to the Softmax layer. Since the training sample usually uses tens of thousands of users as voice sources to collect samples, there exist tens of thousands of nodes in the Softmax layer.

The above-mentioned first stop condition may be reflected in a way that a convergence speed or performance reaches a certain degree, for example, an iteration value tends to converge, or the performance of the initial model on a test set tends to converge. For example, in the pre-training procedure of the initial model, iteration of the classification error is performed to achieve parameter tuning of the deep neural network. However, as training proceeds, the classification error tends to converge, for example, if a change rate of iteration values of continuous several times is smaller than a preset threshold, it may be believed that the classification error tends to converge. Again for example, during training, the initial model may be tested on a test set. The test set may be composed of speech data of known users different from the training data. The initial model is used to test on the test set, extract the second acoustic feature, use the extracted second acoustic feature to perform a test such as user recognition, and judge whether EER or ACC gradually tends to converge.

103 relates to using a triplet loss layer to replace the Softmax layer in the initial model to constitute an acoustic feature extracting model, and continuing to train the acoustic feature extracting model until a preset second stop condition is reached, the acoustic feature extracting model being used to output the second acoustic feature of the speech data.

Figure 4:
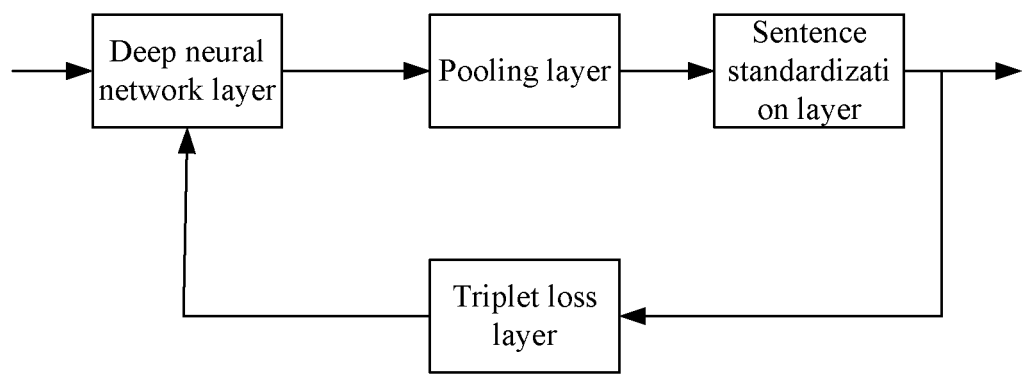
FIG. 4 is structural diagram of an acoustic feature extracting model according to an embodiment of the present disclosure.

After the above replacement, the acoustic feature extracting model may be structured as shown in FIG. 4. The deep neural network and the pooling layer still keep situations of the trained initial model invariable, and the Softmax layer is replaced with the triplet loss layer.

The triplet loss layer is used to maximize similarity between the second acoustic features of the same user, and minimize similarity between the second acoustic features of different users. Specifically, the triplet loss layer may use the second acoustic features of respective speech data to calculate the triplet loss, and the triplet loss may be used to fine-tune parameters of the deep neural network to minimize the triplet loss. The triplet loss reflects a state of difference between similarity between the second acoustic features of different users and similarity between the second acoustic features of the same user.

Preferably, a length standardization layer may be included between the pooling layer and the triplet loss layer. The length standardization layer is used to fine-tune the length of the sentence-level second acoustic feature output by the affine layer to allow the modulus to be 1.

In the embodiment of the present disclosure, the triplet loss layer uses triplet loss to perform feedback training for the deep neural network layer to maximize similarity between the second acoustic features of the same user, and minimize similarity between the second acoustic features of different users.

The triplet loss layer may employ three samples as input: anchor sample including a user's sentence-level second acoustic feature; a positive sample including the second acoustic feature at another sentence level of the same user as the anchor sample; a negative sample including the second acoustic feature at a sentence level of a different use from the anchor sample. The above samples constitute a triplet.

The triplet loss layer performs feedback for the deep neural network layer to enable a cosine similarity between the anchor sample and the positive sample (similarity between samples in the embodiment of the present disclosure is represented by cosine similarity, but other similarity calculation manners are not excluded) to be larger than cosine similarity between the anchor sample and the negative sample. Formally, $$s_i^{ap} - \alpha > s_i^{an}$$

Wherein $s_i^{ap}$ is cosine similarity between the anchor sample a and the positive sample p in the triplet i. $s_i^{an}$ is cosine similarity between the anchor sample a and the negative sample n. The training aims to find the smallest edge $\alpha$ in these similarities. That is, the triplet loss is calculated to reflect a state of difference between similarity between the second acoustic features of different users and similarity between the second acoustic features of the same user. For example, a function L for calculating the triplet loss may be:

$$L = \sum_{i=0}^{N} [s_i^{an} - s_i^{ap} + \alpha]_+$$

wherein N is the number of triplets, and an operator $[x]_+ = \max(x,0)$.

The triplet loss obtained from calculation is fed back to the deep neural network layer to constantly fine-tune the parameter of the deep neural network layer, thereby gradually training the deep neural network, and finally minimizing the triplet loss obtained by calculating with the extracted second acoustic feature. After a second stop condition is reached, the training procedure of this time ends up and the acoustic feature extracting model is obtained.

The second stop condition is similar to the first stop condition and may include an iteration value tending to converge, or the performance of the acoustic feature extracting model on the test set tending to converge.

Figure 5:
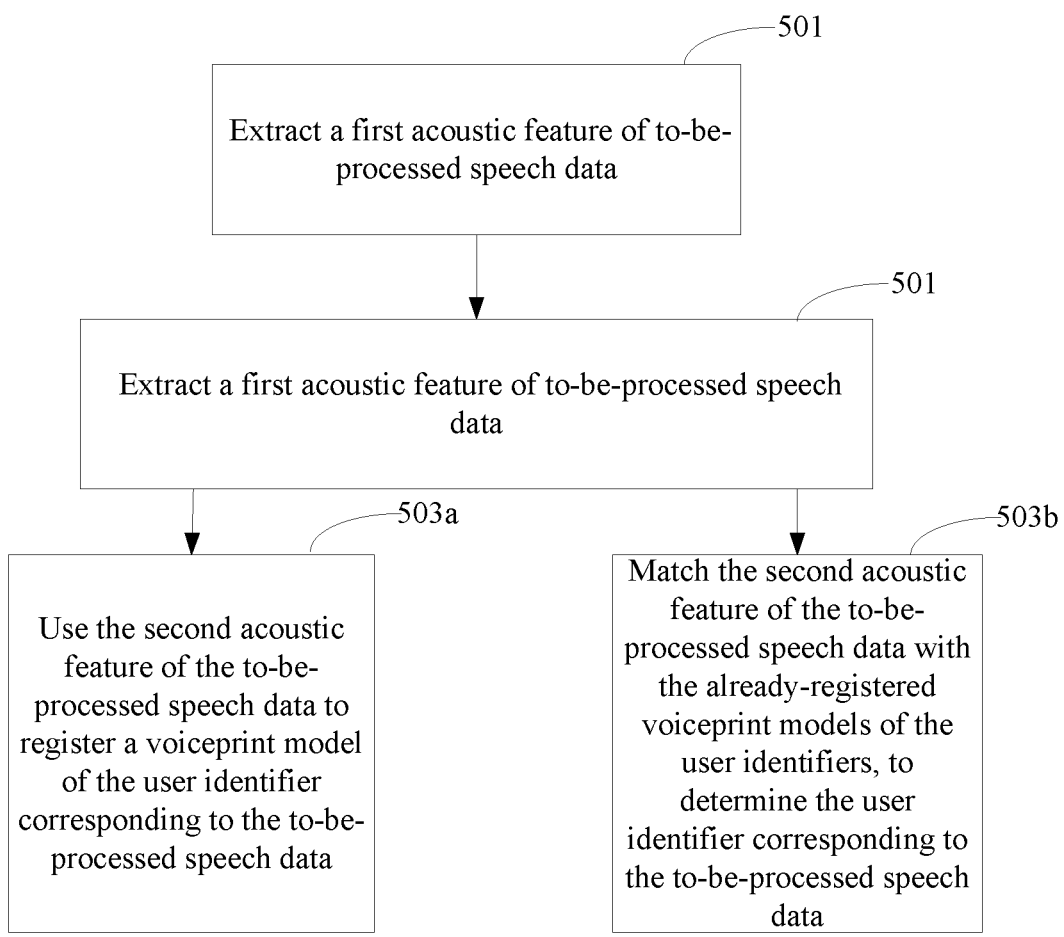
FIG. 5 is a flow chart of a method of extracting an acoustic feature according to an embodiment of the present disclosure.

After the acoustic feature extracting model is obtained by the above training method, the acoustic feature extracting model may be used to extract the acoustic feature. The extracting procedure may be as shown in FIG. 5 and comprises the following steps:

In 501 is extracted the first acoustic feature of the to-be-processed speech data.

This step is pre-processing the to-be-processed speech data, namely, extracting the first acoustic feature therefrom which is the low-level acoustic feature. The first acoustic feature extracted here is consistent with the first acoustic feature extracted in step 101 in the embodiment shown in FIG. 1 in type and manner and will not be detailed any more here.

In 502, the extracted first acoustic feature is input into the acoustic feature extracting model, to obtain the second acoustic feature of the to-be-processed speech data.

Since the acoustic feature extracting model obtained by pre-training has already finished self-learning from the first acoustic feature to the second acoustic feature from the training data, the acoustic feature extracting model can output the second acoustic feature of the to-be-processed speech data after the first acoustic feature of the to-be-processed speech data extracted in step 501 is input into the acoustic feature extracting model. The second acoustic feature may be a sentence-level high-level acoustic feature.

After the second acoustic feature of the to-be-processed speech data is obtained, the second acoustic feature may be used to perform the processing of subsequent application. In 503a, the second acoustic feature of the to-be-processed speech data is used to register a voiceprint model of the user identifier corresponding to the to-be-processed speech data. Or in 503b, the second acoustic feature of the to-be-processed speech data is matched with the already-registered voiceprint models of the user identifiers, to determine the user identifier corresponding to the to-be-processed speech data.

In 503a, if the user identifier corresponding to the to-be-processed speech data is known, the extracted second acoustic feature may be used to register the voiceprint model corresponding to the user identifier. Upon registration of the voiceprint model, the extracted second acoustic feature may be processed as voiceprint information which is stored in the voiceprint model. One or more second acoustic features corresponding to the user identifier may be used to register the acoustic model. A specific registration procedure is not specifically limited in the present disclosure.

In 503b, if the user identifier corresponding to the to-be-processed speech data is unknown, it is feasible to use the extracted second acoustic feature to match with the already-registered voiceprint models in a voiceprint model repository, for example, match by calculating similarity between the extracted second acoustic feature and the voiceprint models in the voiceprint model repository. If a certain voiceprint model is successfully matched, it may be determined that the to-be-processed speech data corresponds to the user identifier corresponding to the successfully matched voiceprint model.

The above 503a and 503b are two application manners of the extracted second acoustic feature of the speech data according to the embodiment of the present disclosure. Certainly, other applications may be performed in addition to the two application manners and are not exhausted in the present disclosure.

The above method may be applied to a speech recognition system. A subject for executing the method may be a corresponding apparatus. The apparatus may be application located at the user equipment, or a function unit such as a plug-in or Software Development Kit (SDK) in an application located in the user equipment. The user equipment may include but is not limited to a smart mobile terminal, a smart household device, a network device, a wearable device, a smart medical device, a PC (personal computer) and the like. The smart mobile device may include for example a mobile phone, a tablet computer, a notable computer, a PDA (personal digital assistant), an Internet vehicle and the like. The smart household device may include a smart electrical appliance such as a smart TV set, a smart air conditioner, a smart water heater, a smart refrigerator, a smart air purifier and the like. The smart household device may further comprise a smart door lock, a smart electrical lamp, a smart camera and the like. The network device may comprise a switchboard, a wireless AP, a server and the like. The wearable device may comprise for example a smart watch, smart glasses, a smart bracelet, a virtual reality device, an augmented reality device, a mixed reality device (namely, a device that may support virtual reality and augmented reality). The smart medical device may comprise for example a smart thermometer, a smart blood pressure meter, a smart blood sugar meter and the like.

Figure 6:
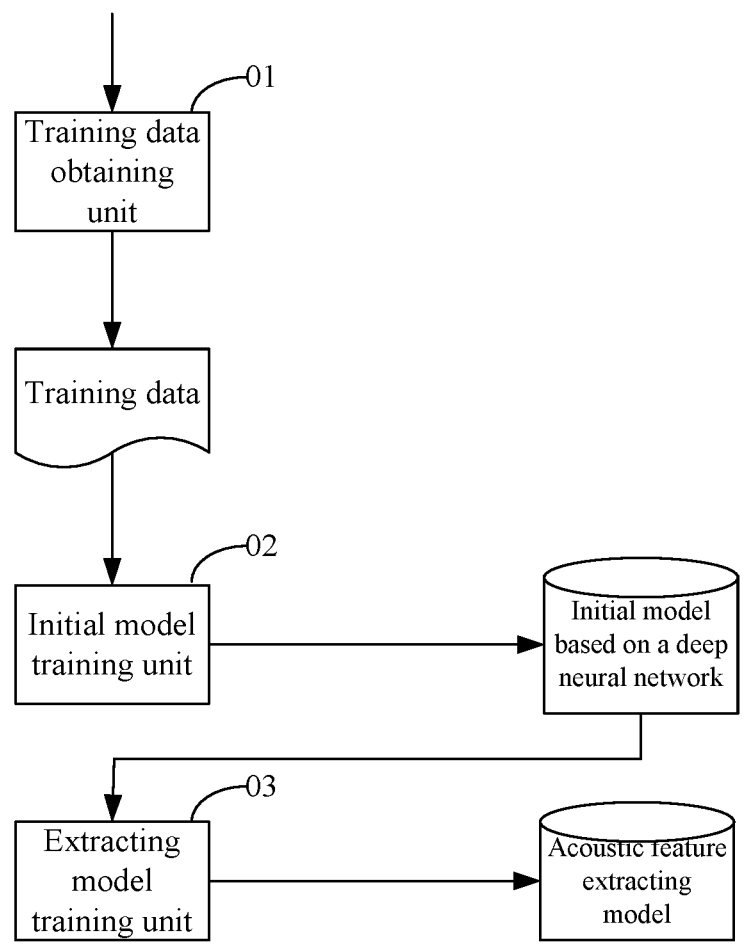
FIG. 6 is a structural diagram of an apparatus of training an acoustic feature extracting model according to an embodiment of the present disclosure.

FIG. 6 is a structural diagram of an apparatus of training an acoustic feature extracting model according to an embodiment of the present disclosure. As shown in FIG. 6, the apparatus may comprise a training data obtaining unit 01, an initial model training unit 02 and an extracting model training unit 03. Main functions of the units are as follows:

The training data obtaining unit 01 is configured to consider a first acoustic feature extracted respectively from speech data corresponding to user identifiers as training data.

It is feasible to pre-collect a known user's speech data, and upon selecting training data, impose some requirements for quality of these speech data, e.g., select speech data with a better definition, and then for example delete speech data with a too long or too short length.

The collected speech data is first pre-processed to extract therefrom the first acoustic feature of respective speech data. As stated above, the first acoustic feature is the low-level acoustic feature. In the embodiment of the present disclosure, an FBank feature may be used as the first acoustic feature. For example, the FBank feature of the speech data is extracted with 25 ms as a frame and with 10 ms as a step length. However, the present disclosure is not limited to the FBank feature and other features may be used as the first acoustic features.

The initial model training unit 02 is configured to train the initial model based on the deep neural network based on a criterion of a minimum classification error, until a preset first stop condition is reached.

The initial model based on the deep neural network is as shown in FIG. 2 and mainly comprises three layers: a deep neural network, a pooling layer and a Softmax layer.

The deep neural network may employ CNN, GRU and the like. Certainly, other types of deep neural networks such as RNN and LSTM may be employed. Since CNN can more effectively reduce spectrum changes and reflect spectrum correlation in the acoustic features as compared with RNN and LSTM, CNN is preferably selected as the deep neural network in the embodiment of the present disclosure.

However, although the deep neural network has an excellent learning capability, it is trained more difficulty. The accuracy undesirably drops in the case of certain depth. To solve the problem, the present disclosure may, based on CNN, uses but is not limited to ResNet-type CNN, or uses GRU.

The upper layer of the deep neural network is a pooling layer. The pooling layer is used to perform sentence averaging processing for the second acoustic feature at a frame level output by the deep neural network, to obtain the second acoustic feature at a sentence level.

Through the processing of the pooling layer, the acoustic feature extracting model according to the embodiment of the present disclosure can process sentences of different time lengths and applies to text-independent cases.

In addition, the pooling layer may further comprise an affine layer (not shown in FIG. 2) which is used to project the second acoustic feature at the sentence level to a preset dimensionality for example to 512 dimensions.

The initial model of the deep neural network in the present embodiment is in fact a multi-class model whose output layer is a Softmax layer mainly functioning to map the second acoustic feature at the sentence level to a class corresponding to each user identifier.

In the present disclosure, the pre-training procedure is in fact used to initialize parameters of the deep neural network so that the initialized deep neural network can minimize a classification error of the Softmax layer. Then, triplet loss is used to continue to perform model training and fine-tune the parameters of the deep neural network. The criterion of the minimum classification error may comprise a cross entropy rule. Since the Softmax layer and cross entropy rule are known concepts in the prior art, they are not detailed any more here.

Since the Softmax layer corresponds to multiple classes, usually the number of users for the training sample is the same the number of nodes corresponding to the Softmax layer. Since the training sample usually uses tens of thousands of users as voice sources to collect samples, there exist tens of thousands of nodes in the Softmax layer.

The above-mentioned first stop condition may be reflected in a way that a convergence speed or performance reaches a certain degree, for example, may include but is not limited to at least one of the following:

an iteration value tends to converge, or the performance of the initial model on a test set tends to converge. For example, in the pre-training procedure of the initial model, iteration of the classification error is performed to achieve parameter tuning of the deep neural network. However, as training proceeds, the classification error tends to converge, for example, if a change rate of iteration values of continuous several times is smaller than a preset threshold, it may be believed that the classification error tends to converge. Again for example, during training, the initial model may be tested on a test set. The test set may be composed of speech data of known users different from the training data. The initial model is used to test on the test set to extract the second acoustic feature, extract the second acoustic feature, and use the extracted second acoustic feature to perform a test such as user recognition, and judge whether EER or ACC tends to converge.

The extracting model training unit 03 is configured to use a triplet loss layer to replace the Softmax layer in the initial model to constitute an acoustic feature extracting model, and continue to train the acoustic feature extracting model until a preset second stop condition is reached, the acoustic feature extracting model being used to output the second acoustic feature of the speech data; wherein the triplet loss layer is used to maximize similarity between the second acoustic features of the same user, and minimize similarity between the second acoustic features of different users.

After the above replacement, the acoustic feature extracting model may be structured as shown in FIG. 4. The deep neural network and the pooling layer still keep situations of the trained initial model invariable, and the Softmax layer is replaced with the triplet loss layer.

The triplet loss layer is used to maximize similarity between the second acoustic features of the same user, and minimize similarity between the second acoustic features of different users. Specifically, the triplet loss layer may use the second acoustic features of respective speech data to calculate the triplet loss, and the triplet loss may be used to fine-tune parameters of the deep neural network to minimize the triplet loss. The triplet loss reflects a state of difference between similarity between the second acoustic features of different users and similarity between the second acoustic features of the same user.

Preferably, a length standardization layer may be included between the pooling layer and the triplet loss layer. The length standardization layer is used to fine-tune the length of the sentence-level second acoustic feature output by the affine layer to allow the modulus to be 1.

In the embodiment of the present disclosure, the triplet loss layer uses triplet loss to perform feedback training for the deep neural network layer to maximize similarity between the second acoustic features of the same user, and minimize similarity between the second acoustic features of different users.

The triplet loss layer may employ three samples as input: anchor sample including a user's sentence-level second acoustic feature; a positive sample including the second acoustic feature at another sentence level of the same user as the anchor sample; a negative sample including the second acoustic feature at a sentence level of a different use from the anchor sample. The above samples constitute a triplet.

The triplet loss layer performs feedback for the deep neural network layer to enable a cosine similarity between the anchor sample and the positive sample (similarity between samples in the embodiment of the present disclosure is represented by cosine similarity, but other similarity calculation manners are not excluded) to be larger than cosine similarity between the anchor sample and the negative sample. That is, the triplet loss is calculated to reflect a state of difference between similarity between the second acoustic features of different users and similarity between the second acoustic features of the same user.

The triplet loss obtained from calculation is fed back to the deep neural network layer to constantly fine-tune the parameter of the deep neural network layer, thereby gradually training the deep neural network, and finally minimizing the triplet loss obtained by calculating with the extracted second acoustic feature. After a second stop condition is reached, the training procedure of this time ends up and the acoustic feature extracting model is obtained.

The second stop condition is similar to the first stop condition and may include an iteration value tending to converge, or the performance of the acoustic feature extracting model on the test set tending to converge.

Figure 7:
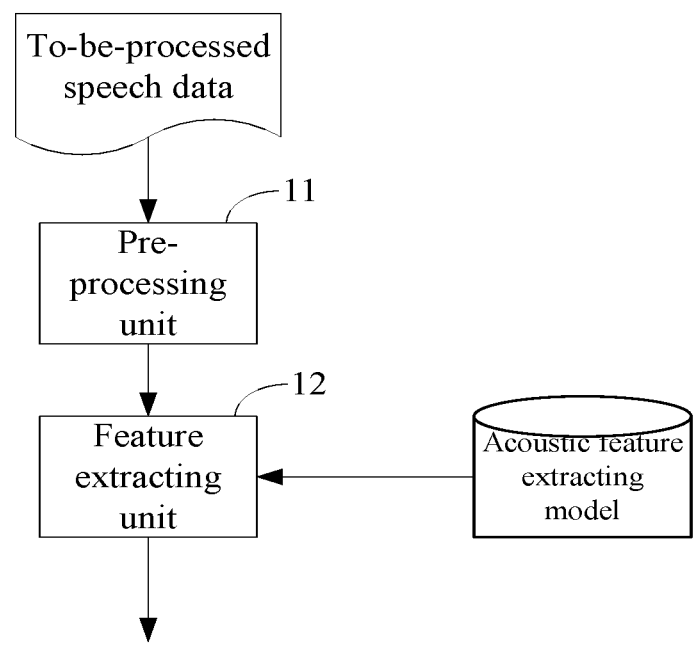
FIG. 7 is a structural diagram of an apparatus of extracting an acoustic feature according to an embodiment of the present disclosure.

FIG. 7 is a structural diagram of an apparatus of extracting an acoustic feature according to an embodiment of the present disclosure. As shown in FIG. 7, the apparatus may comprise a pre-processing unit 11 and a feature extracting unit 12. Main functions of the units are as follows:

The pre-processing unit 11 is configured to extract the first acoustic feature of the to-be-processed speech data. The first acoustic feature is consistent with the first acoustic feature when the data obtaining unit 01 obtains the training data in FIG. 6 in type and extraction manner. For example, the first acoustic feature may employ an FBank feature.

The feature extracting unit 12 is configured to input the first acoustic feature into the acoustic feature extracting model, to obtain the second acoustic feature of the to-be-processed speech data.

Figure 8:
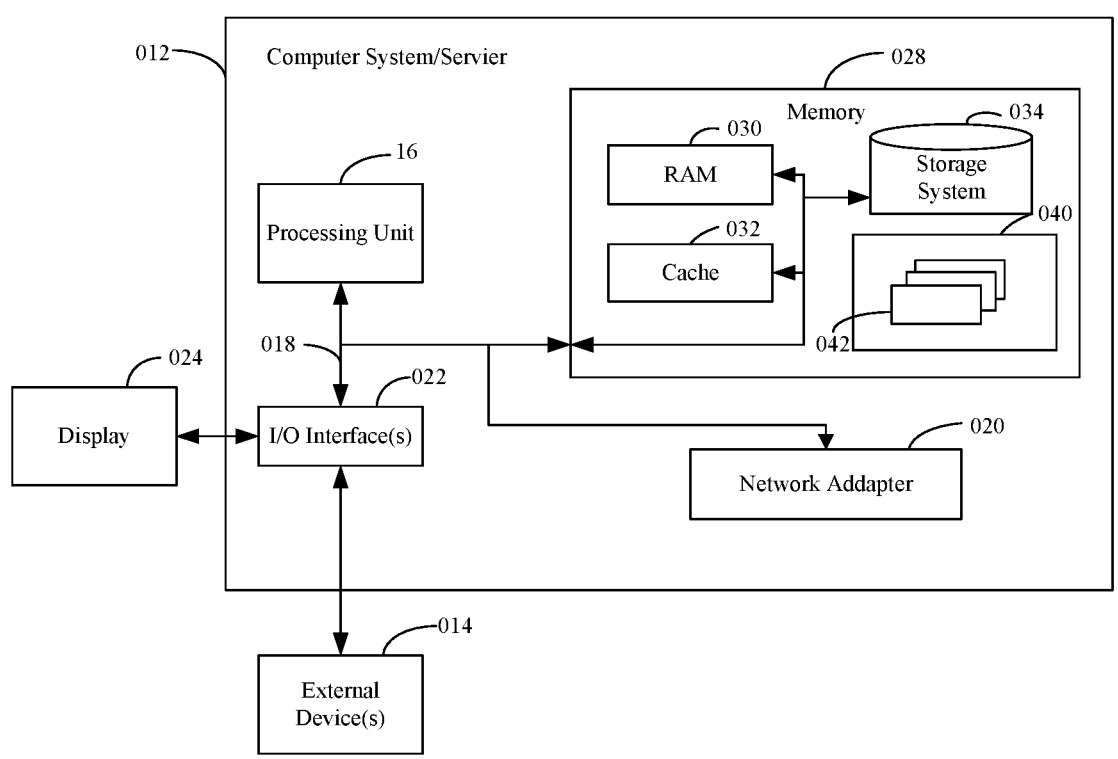
FIG. 8 is a block diagram of a computer system/server according to an embodiment of the present disclosure.

FIG. 8 illustrates a block diagram of an example computer system/server 012 adapted to implement an implementation mode of the present disclosure. The computer system/server 012 shown in FIG. 8 is only an example and should not bring about any limitation to the function and scope of use of the embodiments of the present disclosure.

As shown in FIG. 8, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 8 and typically called a "hard drive"). Although not shown in FIG. 8, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 8, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implements a method of training an acoustic feature extracting model, which comprises:

considering a first acoustic feature extracted respectively from speech data corresponding to user identifiers as training data;

training an initial model based on a deep neural network based on a criterion of a minimum classification error, until a preset first stop condition is reached;

using a triplet loss layer to replace a Softmax layer in the initial model to constitute an acoustic feature extracting model, and continuing to train the acoustic feature extracting model until a preset second stop condition is reached, the acoustic feature extracting model being used to output a second acoustic feature of the speech data;

wherein the triplet loss layer is used to maximize similarity between the second acoustic features of the same user, and minimize similarity between the second acoustic features of different users.

Again for example, implements an acoustic feature extracting method, comprising:

extracting the first acoustic feature of the to-be-processed speech data;

inputting the first acoustic feature into the acoustic feature extracting model, to obtain the second acoustic feature of the to-be-processed speech data.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, the flow of the method performed by the one or more processors may comprise:

considering a first acoustic feature extracted respectively from speech data corresponding to user identifiers as training data;

training an initial model based on a deep neural network based on a criterion of a minimum classification error, until a preset first stop condition is reached;

using a triplet loss layer to replace a Softmax layer in the initial model to constitute an acoustic feature extracting model, and continuing to train the acoustic feature extracting model until a preset second stop condition is reached, the acoustic feature extracting model being used to output a second acoustic feature of the speech data;

wherein the triplet loss layer is used to maximize similarity between the second acoustic features of the same user, and minimize similarity between the second acoustic features of different users.

Again for example, the flow of the method performed by the one or more processors may comprise:

extracting the first acoustic feature of the to-be-processed speech data;

inputting the first acoustic feature into the acoustic feature extracting model, to obtain the second acoustic feature of the to-be-processed speech data.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It can be seen from the above depictions that the method, apparatus, device and computer storage device according to the present disclosure may have the following advantages:

1) In the present disclosure, first the initial model based on the deep neural network is trained based on a criterion of a minimum classification error, until a preset first stop condition is reached, then a triplet loss layer is used to replace a Softmax layer in the initial model, and the acoustic feature extracting model is continued to be trained until a preset second stop condition is reached. Such pre-training+fine-tuning model training manner can improve the performance and accuracy of the model training in a larger feature space as compared with a recurrent training manner purely using Softmax.

2) As compared with a manner directly using the triplet loss to train the acoustic feature extracting model, such re-training+fine-tuning model training manner is proved by experiments to have a higher validation set accuracy (ACC) and equal error rate (EER) in addition to a higher training efficiency.

3) In the present disclosure, ResCNN or GRU type deep neural network is preferably selected to ensure the accuracy of feature extraction and improve the training speed of the deep neural network in the case that a higher-level deep neural network is employed.

4) During the training of the acoustic feature extracting model in the present disclosure, the output of the deep neural network is subjected to the pooling and sentence standardization processing so that that model can perform feature extraction with respect to text-irrelevant speech data very well in addition to performing feature extraction with respect to the text-relevant speech data.

5) It is found after experiments that the present disclosure can better process large-scale speech data and be well adapted to process different languages.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method of training an acoustic feature extracting model, wherein the method comprises:

considering a first acoustic feature extracted respectively from speech data corresponding to user identifiers as training data;

training an initial model based on a deep neural network based on a criterion of a minimum classification error, until a preset first stop condition is reached;

using a triplet loss layer to replace a Softmax layer in the initial model to constitute an acoustic feature extracting model, and continuing to train the acoustic feature extracting model until a preset second stop condition is reached, the acoustic feature extracting model being used to output a second acoustic feature of the speech data, wherein the second stop condition comprises at least one of the following: an iteration value tends to converge; a performance of the acoustic feature extracting model on a test set tends to converge;

wherein the triplet loss layer is used to maximize similarity between the second acoustic features of the same user, and minimize similarity between the second acoustic features of different users, and the triplet loss layer employs three samples as input: anchor sample including a user's sentence-level second acoustic feature; a positive sample including the second acoustic feature at another sentence level of the same user as the anchor sample; a negative sample including the second acoustic feature at a sentence level of a different user from the anchor sample, wherein the initial model based on the deep neural network comprises: a deep neural network, a pooling layer and a Softmax layer;

the deep neural network is used to learn the first acoustic feature of each speech data, and output the second acoustic feature at a frame level;

the pooling layer is used to perform sentence averaging processing for the second acoustic feature at the frame level, to obtain the second acoustic feature at a sentence level, the pooling layer comprising as affine layer which is used to project the second acoustic feature at the sentence level to a preset dimensionality;

the Softmax layer is used to map the second acoustic feature at the sentence level to a class corresponding to each user identifier, and wherein a length standardization layer is included between the pooling layer and the triplet loss layer, which is used to fine-tune the length of the sentence-level second acoustic feature output by the affine layer to allow the modulus to be 1.

2. The method according to claim 1, wherein the first acoustic feature comprises an FBank acoustic feature.

3. The method according to claim 1, wherein the criterion of the minimum classification error comprises a cross entropy rule.

4. The method according to claim 1, wherein the deep neural network comprises a convolutional neural network CNN, a residual convolutional neural network ResCNN or a Gated Recurrent Unit GRU.

5. The method according to claim 1, wherein the first stop condition comprises at least one of the following:

an iteration value tends to converge;

a performance of the initial model on a test set tends to converge.

6. The method according to claim 1, wherein the triplet loss layer is specifically used to use the second acoustic features of respective speech data to calculate the triplet loss, and the triplet loss is used to fine-tune parameters of the deep neural network to minimize the triplet loss;

wherein the triplet loss reflects a state of difference between similarity between the second acoustic features of different users and similarity between the second acoustic features of the same user.

7. The method according to claim 1, wherein the method further comprises:

extracting a first acoustic feature of to-be-processed speech data;

inputting the first acoustic feature into the acoustic feature extracting model, to obtain a second acoustic feature of the to-be-processed speech data.

8. A device, wherein the device comprises:

one or more processors;

a memory for storing one or more programs, the one or more programs, when executed by said one or more processors, enabling said one or more processors to implement the following operation:

considering a first acoustic feature extracted respectively from speech data corresponding to user identifiers as training data;

training an initial model based on a deep neural network based on a criterion of a minimum classification error, until a preset first stop condition is reached;

using a triplet loss layer to replace a Softmax layer in the initial model to constitute an acoustic feature extracting model, and continuing to train the acoustic feature extracting model until a preset second stop condition is reached, the acoustic feature extracting model being used to output a second acoustic feature of the speech data, wherein the second stop condition comprises at least one of the following: an iteration value tends to converge; a performance of the acoustic feature extracting model on a test set tends to converge;

wherein the triplet loss layer is used to maximize similarity between the second acoustic features of the same user, and minimize similarity between the second acoustic features of different users, and the triplet loss layer employs three samples as input: anchor sample including a user's sentence-level second acoustic feature; a positive sample including the second acoustic feature at another sentence level of the same user as the anchor sample; a negative sample including the second acoustic feature at a sentence level of a different user from the anchor sample, wherein the initial model based on the deep neural network comprises: a deep neural network, a pooling layer and a Softmax layer;

the deep neural network is used to learn the first acoustic feature of each speech data, and output the second acoustic feature at a frame level;

the pooling layer is used to perform sentence averaging processing for the second acoustic feature at the frame level, to obtain the second acoustic feature at a sentence level, the pooling layer comprising as affine layer which is used to project the second acoustic feature at the sentence level to a preset dimensionality;

the Softmax layer is used to map the second acoustic feature at the sentence level to a class corresponding to each user identifier, and wherein a length standardization layer is included between the pooling layer and the triplet loss layer, which is used to fine-tune the length of the sentence-level second acoustic feature output by the affine layer to allow the modulus to be 1.

9. The device according to claim 8, wherein the first acoustic feature comprises an FBank acoustic feature.

10. The device according to claim 8, wherein the criterion of the minimum classification error comprises a cross entropy rule.

11. The device according to claim 8, wherein the deep neural network comprises a convolutional neural network CNN, a residual convolutional neural network ResCNN or a Gated Recurrent Unit GRU.

12. The device according to claim 8, wherein the first stop condition comprises at least one of the following:
an iteration value tends to converge;
a performance of the initial model on a test set tends to converge.

13. The device according to claim 8, wherein the triplet loss layer is specifically used to use the second acoustic features of respective speech data to calculate the triplet loss, and the triplet loss is used to fine-tune parameters of the deep neural network to minimize the triplet loss;
wherein the triplet loss reflects a state of difference between similarity between the second acoustic features of different users and similarity between the second acoustic features of the same user.

14. The device according to claim 8, wherein the operation further comprises:
extracting a first acoustic feature of to-be-processed speech data;
inputting the first acoustic feature into the acoustic feature extracting model, to obtain a second acoustic feature of the to-be-processed speech data.

15. A non-transitory computer storage medium containing computer-executable instructions which, when executed by a computer processor, are used to implement the following operation:
considering a first acoustic feature extracted respectively from speech data corresponding to user identifiers as training data;
training an initial model based on a deep neural network based on a criterion of a minimum classification error, until a preset first stop condition is reached;
using a triplet loss layer to replace a Softmax layer in the initial model to constitute an acoustic feature extracting model, and continuing to train the acoustic feature extracting model until a preset second stop condition is reached, the acoustic feature extracting model being used to output a second acoustic feature of the speech data, wherein the second stop condition comprises at least one of the following: an iteration value tends to converge; a performance of the acoustic feature extracting model on a test set tends to converge;
wherein the triplet loss layer is used to maximize similarity between the second acoustic features of the same user, and minimize similarity between the second acoustic features of different users, and
the triplet loss layer employs three samples as input: anchor sample including a user's sentence-level second acoustic feature; a positive sample including the second acoustic feature at another sentence level of the same user as the anchor sample; a negative sample including the second acoustic feature at a sentence level of a different user from the anchor sample,
wherein the initial model based on the deep neural network comprises: a deep neural network, a pooling layer and a Softmax layer;
the deep neural network is used to learn the first acoustic feature of each speech data, and output the second acoustic feature at a frame level;
the pooling layer is used to perform sentence averaging processing for the second acoustic feature at the frame level, to obtain the second acoustic feature at a sentence level, the pooling layer comprising as affine layer which is used to project the second acoustic feature at the sentence level to a preset dimensionality;
the Softmax layer is used to map the second acoustic feature at the sentence level to a class corresponding to each user identifier, and
wherein a length standardization layer is included between the pooling layer and the triplet loss layer, which is used to fine-tune the length of the sentence-level second acoustic feature output by the affine layer to allow the modulus to be 1.

16. The non-transitory computer storage medium according to claim 15, wherein the first acoustic feature comprises an FBank acoustic feature.

17. The non-transitory computer storage medium according to claim 15, wherein the criterion of the minimum classification error comprises a cross entropy rule.

18. The non-transitory computer storage medium according to claim 15, wherein the deep neural network comprises a convolutional neural network CNN, a residual convolutional neural network ResCNN or a Gated Recurrent Unit GRU.

19. The non-transitory computer storage medium according to claim 15, wherein the first stop condition comprises at least one of the following:
an iteration value tends to converge;
a performance of the initial model on a test set tends to converge.

20. The non-transitory computer storage medium according to claim 15, wherein the triplet loss layer is specifically used to use the second acoustic features of respective speech data to calculate the triplet loss, and the triplet loss is used to fine-tune parameters of the deep neural network to minimize the triplet loss;
wherein the triplet loss reflects a state of difference between similarity between the second acoustic features of different users and similarity between the second acoustic features of the same user.

21. The non-transitory computer storage medium according to claim 15, wherein the operation further comprises:
extracting a first acoustic feature of to-be-processed speech data;
inputting the first acoustic feature into the acoustic feature extracting model, to obtain a second acoustic feature of the to-be-processed speech data.

* * * * *